United States Patent

Kim

Patent Number: 5,973,794
Date of Patent: Oct. 26, 1999

[54] HALF-TONE PROCESSING METHOD

[75] Inventor: Sang-uk Kim, Seoul, Rep. of Korea

[73] Assignee: Samsung Electronics Co., Ltd., Kyungki-do, Rep. of Korea

[21] Appl. No.: 08/805,528

[22] Filed: Feb. 25, 1997

Related U.S. Application Data

[63] Continuation of application No. 08/581,886, Jan. 2, 1996, abandoned, which is a continuation of application No. 08/168,305, Dec. 17, 1993, abandoned.

[30] Foreign Application Priority Data

Apr. 30, 1993 [KR] Rep. of Korea .................. 93-7472

[51] Int. Cl.$^6$ .................................................. H04N 1/40
[52] U.S. Cl. ..................... 358/455; 358/456; 358/457; 382/252
[58] Field of Search .................................. 358/447, 448, 358/455, 456, 457, 465, 466; 382/251, 252

[56] References Cited

U.S. PATENT DOCUMENTS

| | | | |
|---|---|---|---|
| 5,150,429 | 9/1992 | Miller et al. | 358/466 |
| 5,172,247 | 12/1992 | Ghaderi | 358/456 |
| 5,321,525 | 6/1994 | Hains | 358/458 |

*Primary Examiner*—Thomas D. Lee
*Attorney, Agent, or Firm*—Lowe Hauptman Gopstein Gilman & Berner

[57] ABSTRACT

A half-tone processing method includes the steps of generating a half-tone processed pixel value h(u,v) determined by comparing a pixel value f'(u,v) with the dither matrix g(u,v) having the corresponding threshold values, computing an error value e(u,v) between a half-tone processed pixel value h(u,v) and an original pixel value f(u,v), and recomputing a pixel value f'(u+m,v+n) by diffusing the error value e (u,v) to the adjacent pixel f(u+m,v+n) of the original pixel value f(u,v) corresponding to f'(u,v).

1 Claim, 4 Drawing Sheets

FIG. 3A
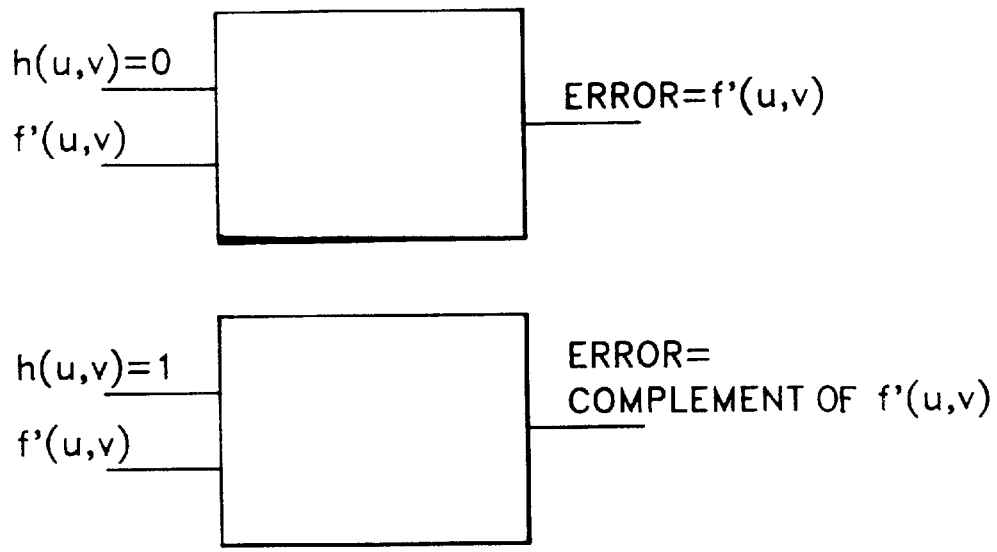
FIG. 3B
| h(u,v) | BIT OF f,(u,v) | ERROR |
|---|---|---|
| 0 | 0 | 0 |
| 0 | 1 | 1 |
| 1 | 0 | 1 |
| 1 | 1 | 0 |
FIG. 3C
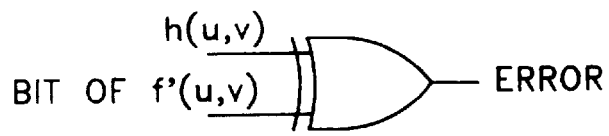

HALF-TONE PROCESSING METHOD

This application is a continuation of U.S. application Ser. No. 08/581,886 filed Jan. 2, 1996, abandoned which is a continuation of U.S. application Ser. No. 08/168,305 filed Dec. 17, 1993, abandoned.

BACKGROUND OF THE INVENTION

The present invention relates to a half-tone processing method which expresses appropriately a picture image having a continuous tone using a limited level value.

A half-tone processing method is to adjust a change of a tone smoothly by expressing every pixel value having continuous values with variously sized dots or with variable diffusion levels of the same sized dots. Since such a half-tone processing method can express the continuous tone with a limited level, it reduces the cost and the complexity of image expression.

In the dithering method which is one of the conventional half-tone processing methods, an output is supplied if an input value is greater than a predetermined value (threshold value) and otherwise an output is not supplied. Since such a dithering method does not consider human's visual sense, half-tone expression is hard to accomplish.

Another example of conventional half-tone processing methods is an ordered dithering. The ordered dithering which expresses the intensity of dots which are mutually adjacent or remote, obtains a dither matrix in consideration of the spatial distribution of dots, compares the respective threshold values and the pixel values and outputs the result as a half-tone processed pixel value. Such a method shows a smoother output than that of dithering method, but produces a Moire phenomenon, which shows a sense of spreading in an expressed image.

Still another example of conventional half-tone processing methods is error diffusion. The error diffusion method computes an error between an original pixel value and a half-tone processed pixel value, which is generated as a compared result of an original pixel value and a predetermined threshold value (in general, the arithmetic mean values of adjacent pixels of an objective pixel), then multiplies the error value by a weight considering a spatial relationship between the objective pixel and the adjacent pixels thereof and diffuses the multiplied error value. The error diffusion method can eliminate the Moire phenomenon, but produces a texture pattern in which a geometrical pattern is repeated. The texture pattern may offend the human's visual sense by repeating a specific pattern.

SUMMARY OF THE INVENTION

Therefore, it is an object of the present invention to provide an improved half-tone processing method to solve the above mentioned problems.

Another object of the present invention is to provide a half-tone processing method which produces an error value between a half-tone processed pixel value determined by utilization of a mask which is a dither matrix considering a spatial distribution and an original pixel value and diffuses it to the adjacently located pixels of an objective pixel.

To accomplish to the above objects, an image processing method according to the present invention comprises the steps of:

generating a half-tone processed pixel value h(u,v) determined by comparing a pixel value f'(u,v) with the dither matrix g(u,v) having the corresponding threshold values;

computing an error value e(u,v) between a half-tone processed pixel value h(u,v) and an original pixel value f(u,v); and recomputing a pixel value f'(u+m,v+n) by diffusing the error value e(u,v) to the adjacent pixel f(u+m,v+n) of the original pixel value f(u,v) corresponding to f'(u,v).

BRIEF DESCRIPTION OF THE DRAWINGS

The above objects and other advantages of the present invention will become more apparent by describing in detail a preferred embodiment thereof with reference to the attached drawings in which:

FIGS. 3A through 3C show the operation of the error determiner shown in FIG. 2.

DETAILED DESCRIPTION OF THE INVENTION

Hereinbelow, the embodiment of the present invention will be described in detail with reference to the accompanying drawings.

Figure 1:
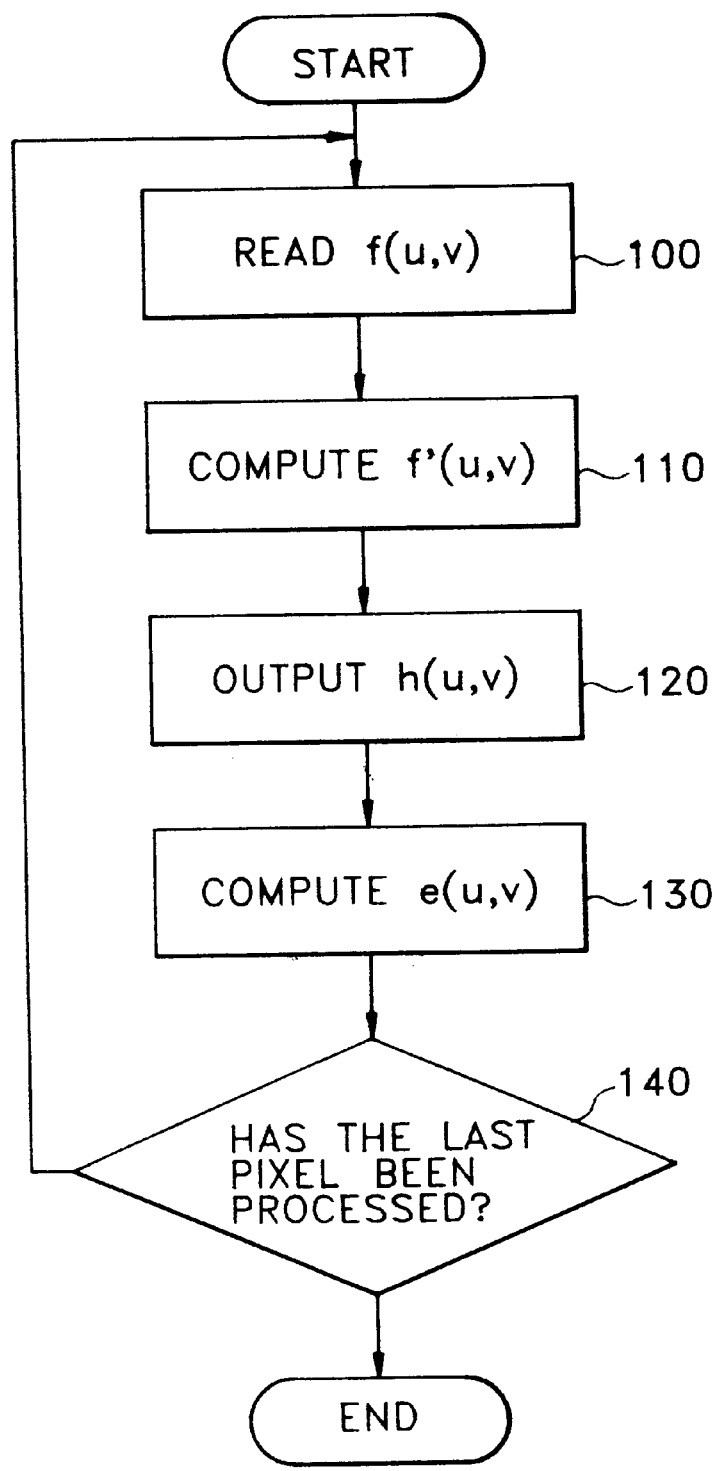
FIG. 1 is a flow chart showing the half-tone processing method according to the present invention.

FIG. 1 is a flow chart showing the half-tone processing method according to the present invention. First, the original pixel value f(u,v) is scanned in the raster scanning order (Step 100).

An error-diffused pixel value f'(u,v) is obtained by the method which can be explained with reference to the following Equation (1) (Step 110).

Here, f'(u,v) represents an error-diffused pixel value which is an original pixel value f(u,v) reevaluated in consideration of a half-tone processed pixel value h(u,v) and the error value e(u,v) to be explained below.

A half-tone processed pixel value h(u,v) is obtained comparing the pixel value f'(u,v) with the dither matrix g(u,v) having threshold values considering a spatial distribution (Step 120).

A single matrix having the same size as that of the original image can be used in obtaining the dither matrix g(u.v). However, in general a dither matrix t(1,m) having a unit size is arranged longitudinally and latitudinally without overlapping. For example if the size of an original pixel is 720 pixels by 480 lines, the dither matrix g(u.v) can be obtained by arranging a 4×4 dither matrix by 180 numbers longitudinally and 120 one latitudinally.

The h(u,v) value is "1" if f'(u,v) is greater than or equal to the g(u,v) value, and is "0" if less than g(u,v).

The h(u,v) value is expressed as a binary level value in order to indicate whether the pixel, which is expressed as a pixel value f(u,v), is represented by a bi-level image output device such as a dot printer.

Next, the error value e(u,v) between an original pixel value f(u,v) and a half-tone processed pixel value h(u,v), determined by the following equation is computed (Step 130). That is, e(u,v) is the complement of f'(u,v) if h(u,v) is equal to "1" and is equal to f'(u,v) if h(u,v) is equal to "0."

In the step 110, the error-diffused pixel value f'(u+m,v+n) is obtained by diffusing the error value (u,v) to the original pixel value f(u+m,v+n) as follows.

$$f'(u+m,v+n)=f(u+m,v+n)+e(u,v)\times d(m,n) \quad (1)$$

Here, m and n are integers and d(m,n) represents an error-diffused matrix having a predetermined weight.

Steps 100 through 130 are performed repeatedly till the last pixel and the half-tone processing is completed (Step 140).

Figure 2:
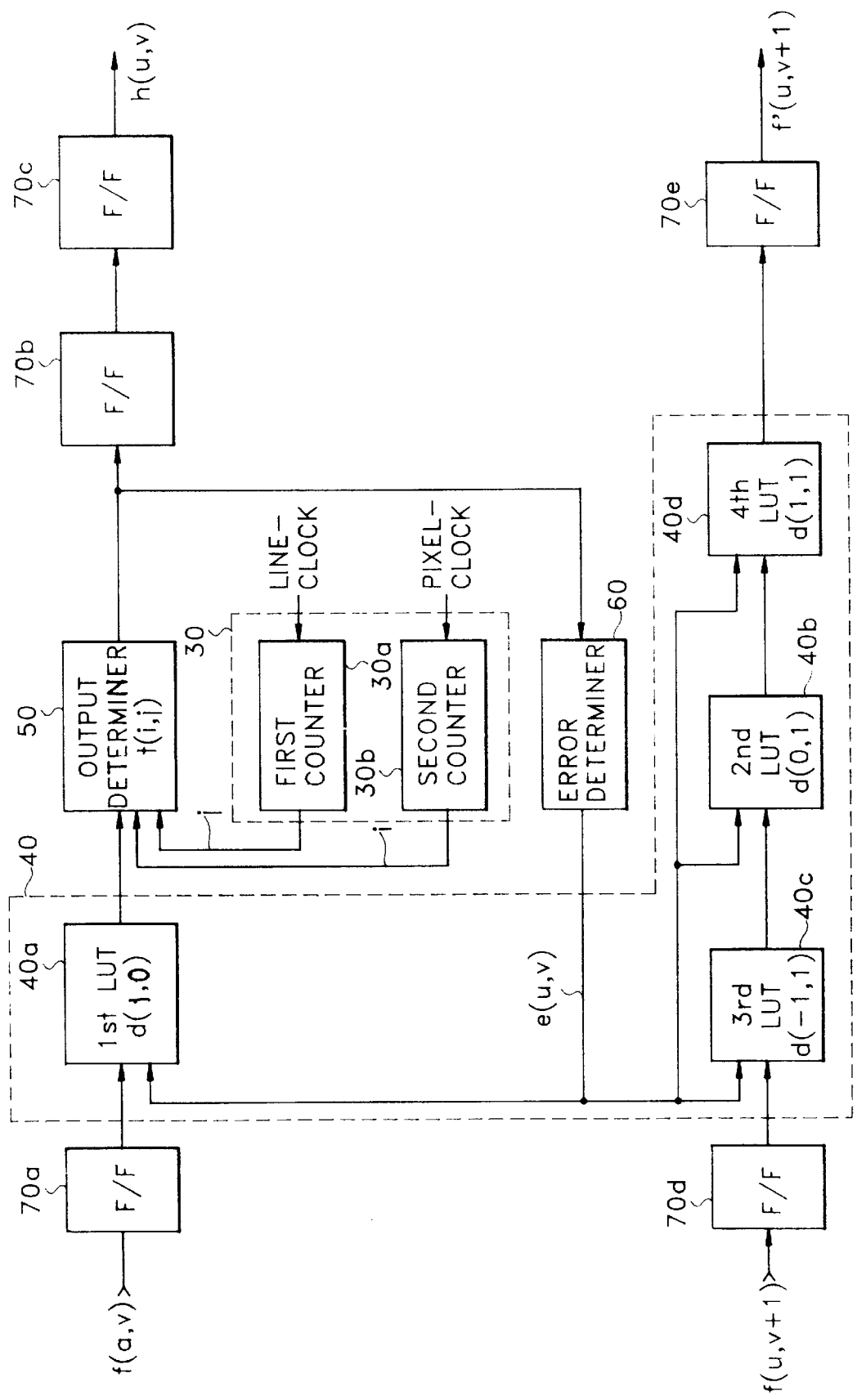
FIG. 2 is a block diagram of the circuit performing the half-tone processing method according to the present invention.

FIG.2 is a block diagram of the circuit performing the half-tone processing method according to the present invention. The half-tone processing circuit shown in FIG.2 includes a look-up table 50 for generating a half-tone image h(u,v) by comparing an error-diffused pixel value f'(u,v) with the threshold value g(u,v) of the corresponding dither matrix, an address generator 30 for generating the address of the corresponding dither matrix g(u,v) of the pixel value f'(u,v) which is input to the look-tip table 50, an error determiner 60 for computing the error value e(u,v) on the basis of the half-tone processed pixel value h(u,v) which is output from the look-Lip table 50 and a pixel value f'(u,v) and a diffusion processor 40 for determining the error-diffused pixel value f'(u,v) of adjacent pixels of the original image f(u,v) on the basis of the error value e(u,v) computed by the error determiner 60.

Further, the diffusion processor 40 includes a first look-up table (LUT) 40*a* for computing an error-diffused pixel value f'(u+1,v) corresponding to the pixel value f(u+1,v), latitudinally prior to the pixel value f(u,v), by one pixel, i.e., the pixel value scanned next in a raster scanning a second look-up table 40*b*, a third look-up table 40*c* and a fourth look-up table 40*d* for computing the error-diffused pixel values f'(u,v+1) corresponding to the pixel value f(u,v+1) of the pixel which is located immediately below the pixel value f(u,v), f'(u−1,v) corresponding to the pixel value f(u−1,v) of the pixel which is located immediately left of the pixel value f(u,v) and f'(u+1,v+1) corresponding to the pixel value f(u+1,v+1) of the pixel which is located immediately right of the pixel value f(u,v), respectively.

The address generator 30 includes a first counter 30*a* for generating a longitudinal address and a second counter 30*b* for generating a latitudinal address. Reference numerals 70*a* through 70*e* represent flip-flops for latching data.

The operation of the circuit illustrated in FIG.2 is hereinbelow explained in more detail.

The Output determiner 50 is constituted by look-up tables of which the input addresses are an address of a dither matrix g(u,v) and an error-diffused pixel value. The dither matrix g(u,v) corresponding to f'(u,v) is obtained by arranging a base dither matrix t(i,j) longitudinally and latitudinally without overlapping. In the embodiment of the present invention, a 4×4 dither matrix is employed as t(i,j).

Assuming that the input address of the output determiner 50 is (A11A10 A9 A8 A7 A6 A5 A4 A3 A2 A1 A0), the error-diffused pixel value f'(u,v) is applied as upper eight bits A11 through A4 of the address, the row address of the dither matrix t(i,j) corresponding thereto is applied as (A3 A2) and the column address is applied as (A1 A0).

The dither matrix t(i,j) constituting the dither matrix g(u,v) can be expressed as the following Table 1.

TABLE 1

|      | 0 0 | 0 1 | 1 0 | 1 1 |
|------|-----|-----|-----|-----|
| 0 0  | a0  | a1  | a3  | a2  |
| 0 1  | a4  | a5  | a7  | a6  |
| 1 0  | a12 | a13 | a15 | a14 |
| 1 1  | a8  | a9  | a11 | a10 |

In Table 1, the uppermost row shows the values of column address (A1A0) of dither matrix t(i,j) and the rightmost row shows the values of row address (A3 A2). Various threshold values can be expressed (up to sixteen) according to the respective values of (a3 a2 a1 a0). The threshold values are compared with the pixel values f(u,v) corresponding to the upper eight bits and the results thereof are output as the half-tone processed pixel values h(u,v).

Since the dither matrix t(i,j) are matched so as to be repeated longitudinally and latitudinally to constitute a dither matrix g(u,v), the dither matrix g(u,v) having the threshold value corresponding to f'(u,v) makes the threshold values constituting the dither matrix t(i,j) to be alternately repeated every ith pixel clock longitudinally and every jth line clock latitudinally. In the embodiment of the present invention, the repeated portion is realized by means of a first counter 30*a* and a second counter 30*b*.

The first counter 30*a* supplies the modulo-i counted value of the line clock input thereto as the row address (A3 A2) of the output determiner 50. The second counter 30*b* supplies the modulo-j counted value of the pixel clock input thereto as the column address (A1 A0) of the output determiner 50. Here, the pixel clock and line clock are scanning periods of latitudinal and longitudinal pixels of the original pixel value f(u,v), respectively.

The half-tone processed pixel value h(u,v) output from the output determiner 50 adjusts a bi-level image output device, for example, the output state of a dot matrix. In other words, if h(u,v) is "1," the dot matrix leaves a dot on the paper, and if h(u,v) is "0," the dot matrix does not leave a dot on the paper.

The error determiner 60 computes error value e(u,v) on the basis of the half-tone processed pixel value h(u,v) output from the look-up table 50 and an error-diffused pixel value f'(u,v).

FIGS.3A through 3C show the operation of the error determiner 60 shown in FIG.2. FIG.3A shows the function of obtaining error values, FIG.3B is the truth table for FIG.3A and FIG.3C is a part of the logic circuit for obtaining error values.

In FIG.3A, if h(u,v) is "0," the error-diffused pixel value f'(u,v) which is input to the Output determiner 50 is Output as an error value e(u,v). On the other hand, if h(u,v) is "1," the complement of the error-diffused pixel value f'(u,v) becomes error value e(u,v).

The diffusion processor 40 determines the error-diffused pixel value f'(u,v) depending on the error value e(u,v) generated in the error determiner 60.

The diffusion processor 40 computers the error-diffused pixel value f'(u,v) by adding the multiplied value of the error value e(u.v) and the error diffusion matrix weight value d(m,n) to the original pixel value f(u,v), as shown in Equation (1).

Here, the weight values d(m,n) are determined in consideration of the spatial distribution for the adjacent pixels. That is to say, the closer to f(u,v) the pixel is, the higher weight value the pixel has, and the total sum of the weight values of the error diffusion matrix becomes "1."

Table 2 shows the weight values of the error diffusion matrix used in the present invention.

TABLE 2

|  | X<br>d(0,0) | 3/8<br>d(1,0) |
|---|---|---|
| 1/8<br>d(-1,a) | 3/8<br>d(0,1) | 1/8<br>d(1,1) |

In Table 2, d(1,0), d(0,1), d(-1,1) and d(1,1) are set to first through fourth look-up tables 40a through 40d of diffusion processor 40, respectively.

The respective look-up tables 40a through 40d determine the error-diffused pixel values f'(u,v) by making the original pixel values f(u,v) as the input addresses, similarly as explained in the output determiner 50.

Figure 4A:
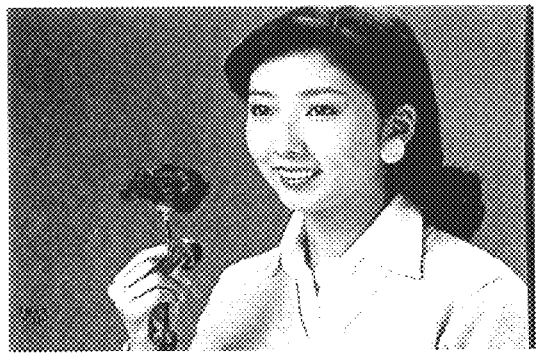
FIGS. 4A through 4D show results of the half-tone processing methods according to conventional and present inventions being applied to practical images.
Figure 4B:
Figure 4C:
Figure 4D:

FIGs.4A through 4D are experimental results for practical images. Here, FIG.4A is an input image, FIG.4B is the result processed by a conventional error diffusion method, FIG.4C is the result processed by a conventional ordered dithering method, and FIG.4D is the result processed by the present invention.

A stain shown like a layer (to be called Moire phenomenon) is shown in the error diffusion method shown in FIG.4B and a geometrical pattern is repeated in the ordered dithering method shown in FIG. 4C. However, in the case of the processing shown in FIG.4D according to the present invention, the Moire phenomenon and the geometrical patterned texture size can be reduced to thereby process an image smoothly.

As described above, the half-tone processing method according to the present invention can process a clean image by reducing the Moire phenomenon and the texture size. Moreover, hardware cost can be reduced by simplifying the circuit.

What is claimed is:

1. A half-tone processing method for expressing a picture image having a continuous tone using a limited level value comprising the step of:

generating a half-tone image which is consisted by processed pixel value h(u,v) determined from a storage means by comparing an error-diffused pixel value f'(u, v) with the dither matrix g(u,v) having the corresponding threshold values, where h(u,v) is equal to "1" if f'(u,v) is greater than or equal to g(u,v) and is equal to "0" if f'(u,v) is less than g(u,v);

computing an error value e(u,v) between a half-tone processed pixel value h(u,v) and an original pixel value f(u,v) where e(u,v) is calculated by an Ex-OR operation of f'(u,v) and modified h(u,v); and computing an error-diffused pixel value f'(u+m, v+n) by using look-up tables where inputs are error value e(u,v) and pixel value f(u+m, v+n), wherein the step of generating a half-tone processed pixel value h(u,v) comprises arranging a base dither matrix t(i,j) longitudinally and latitudinally without overlapping in the storage means and inputting an address of the dither matrix g(u,v) and the error-diffused pixel value f'(u,v), the error value e(u,v) is calculated from processed pixel value h(u,v) and a previous error-diffused pixel value f'(u,v) using an Ex-OR operation, and the step of computing an error-diffused pixel value f'(u+m, v+n) by using look-up tables includes adding the multiplied value of input error value e(u,v) and an error diffusion matrix weight value d(m,n) to the input pixel value f(u+m, v+n).

* * * * *